UNITED STATES PATENT OFFICE.

FREEMAN BROWN, OF HAVERHILL, MASSACHUSETTS, ASSIGNOR TO LOUIS E. HASTINGS, OF SAME PLACE.

IMPROVEMENT IN FRICTION COMPOUNDS FOR BELTS.

Specification forming part of Letters Patent No. 216,596, dated June 17, 1879; application filed February 28, 1879.

*To all whom it may concern:*

Be it known that I, FREEMAN BROWN, of Haverhill, in the county of Essex and State of Massachusetts, have invented a new and Improved Composition to be Applied to Belts; and I do hereby declare that the following is a full and exact description thereof.

The ingredients of this composition are oil, bees-wax, india-rubber, and gum-arabic. For the oil I prefer what is called "neat's-foot oil," as being superior to any other known to me for this purpose; but any other oil having a like effect may be substituted for it. I do not confine myself to any exact proportions of these ingredients; but about the following proportions I find to be essential to the proper effect: oil, one quart; bees-wax, one pound; india-rubber, one pint, in solution; gum-arabic, two ounces.

The india-rubber may be dissolved in naphtha or other solvent before using. The ingredients are simply heated and stirred together, when they are ready for use.

The main purpose of this composition, when rubbed upon belts, is to prevent their slipping on or to increase their adhesion to the pulleys, and it is particularly desirable when the belts become slack. It is also very useful in keeping the belts soft and pliable, and in keeping them from cracking, breaking, or wearing off the grain or fiber, and consequently making them more durable.

I am aware that a composition of neat's-foot oil, bees-wax, resin, mutton-tallow, gum-tragacanth, hard soap, lamp-black, and raw rubber for waterproofing leather has been patented, in which the oil and tallow are largely in excess of the other ingredients, and the gum and rubber are in small proportion. Such a composition I do not claim, since it is not applicable to the purpose of my invention.

What I claim as my invention, and desire to secure by Letters Patent, is—

The composition of oil, bees-wax, india-rubber, and gum-arabic, in about the proportions and for the purpose herein specified.

The foregoing specification signed by me this 12th day of February, 1879.

FREEMAN BROWN.

Witnesses:
E. B. BICKFORD,
JOHN A. PAGE.